Figure 1:
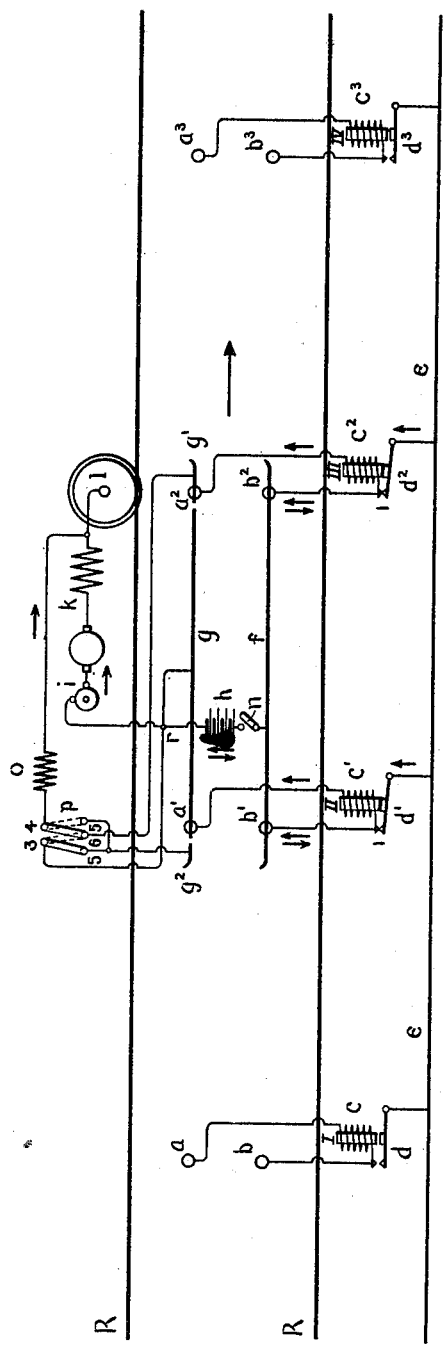

No. 719,016. PATENTED JAN. 27, 1903.
M. T. A. KUBIERSCHKY.
ELECTRIC RAILWAY.
APPLICATION FILED MAR. 22, 1900.
NO MODEL.
2 SHEETS—SHEET 1.

Witnesses.
Inventor.
Martin T. A. Kubierschky
by
Atty.

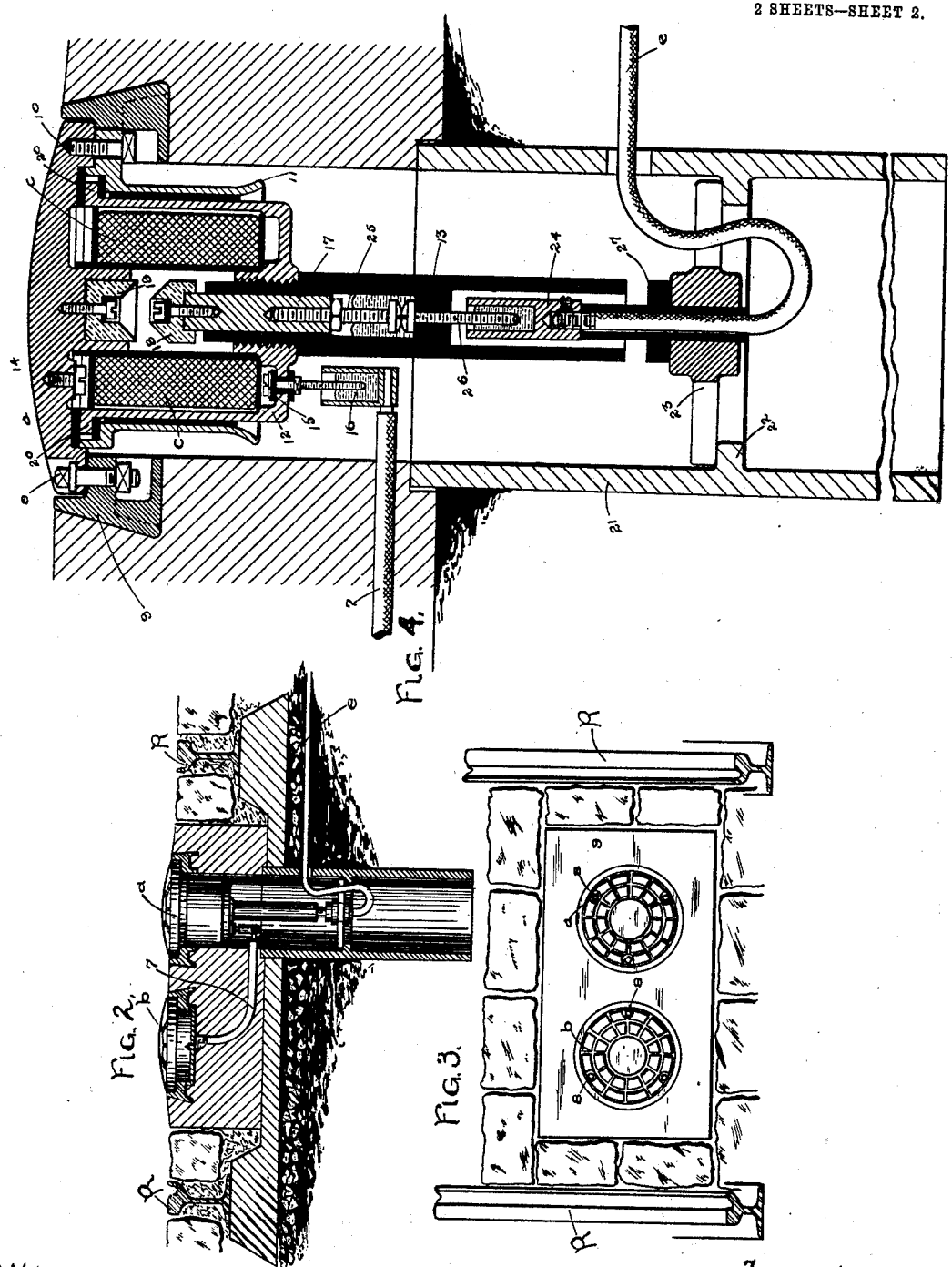

UNITED STATES PATENT OFFICE.

MARTIN T. A. KUBIERSCHKY, OF BERLIN, GERMANY.

ELECTRIC RAILWAY.

SPECIFICATION forming part of Letters Patent No. 719,016, dated January 27, 1903.

Application filed March 22, 1900. Serial No. 9,649. (No model.)

*To all whom it may concern:*

Be it known that I, MARTIN T. A. KUBIERSCHKY, a subject of the Emperor of Germany, residing at Berlin, Germany, have invented certain new and useful Improvements in Electric Railways, of which the following is a specification.

My invention relates to electric railways, and more particularly to electric railways of the surface-contact or sectional-conductor type.

My invention has for its object to produce a positive and rapid closing of the advance-switches in systems employing electromagnetically-actuated switches for connecting the surface contacts or conductor-sections to the feeder, thereby increasing the efficiency of the system.

In the accompanying drawings, which illustrate the preferred embodiment of my invention, Figure 1 is a diagrammatic illustration of my preferred system, showing the circuits used. Figs. 2 and 3 are a transverse section and plan, respectively, of the road construction; and Fig. 4 is a vertical section through the switching mechanism.

Referring now to Fig. 1, pairs of conductor-sections or contact-studs $a\ b$, $a'\ b'$, $a^2\ b^2$, and $a^3\ b^3$ are placed in suitable locations along the road-bed, the successive contacts, which include all those in advance of and in the rear of said pairs, being adapted to be engaged by collector-shoes $f$ and $g$, carried by the car, which moves along the track-rails R R. The said pairs of contact-studs are connected to the feeder $e$ through the electromagnetically-actuated switches I, II, III, and IV. The car motor and controller are designated by $k$ and $i$, respectively, and the storage battery or auxiliary source of power carried by the car by $h$. One of the collector-shoes is divided into three parts $g$, $g'$, and $g^2$, which are insulated from each other, said parts being connected in circuit with or in shunt to the car-motor by means of the reversing-switch $p$ in a manner and for the purpose to be hereinafter described. We will assume the car to be moving toward the right in the direction of the arrow. The initial pick-up circuit, when the switch $n$ is closed, may be traced as follows: from one terminal of the storage battery $h$, through the switch $n$, collector-shoe $f$, conductor-section $b'$, contact 1 of the electromagnetically-actuated switch II, coil $c'$, conductor-section $a'$, collector-shoe $g$, and connection $r$ to the opposite terminal of the battery. The coil $c'$ is energized, and the armature $d'$, which carries a connection from the main feeder $e$, is thereby raised and causes the said connection to engage with the connections of the conductor-sections $a'$ and $b'$. When the armature $d'$ is raised, the circuits from the feeder $e$ are completed, as follows: through the switch-actuating coil $c'$, conductor-section $a'$, motor-controller $i$, motor $k$, to the track-rail return through the wheel $l$, also from the feeder $e$ through the armature $d'$, branching at the contact 1, thence through the conductor-section $b'$, collector-shoe $f$, switch $n$, storage battery $h$ to the track-rail return through the connection $r$, controller $i$, and motor $k$. The motor or motors are now receiving current from the feeder and the battery is being charged. When the battery is sufficiently charged, the switch $n$ is opened, and as the car progresses the collector-shoes $f$ and $g$ will engage with the advance conductor-sections or contact-studs $a^2$ and $b^2$. When the end section $g'$ of one of the collector-shoes engages the contact-stud $a^2$ and the shoe $f$ engages the contact-stud $b^2$, a pick-up circuit is completed through the actuating-coil $c^2$ of the advance switch III. The ends $g'$ and $g^2$ of said collector are insulated from the central portion $g$, and said parts are connected to the reversing-switch $p$, so that the section $g'$ will be connected in the pick-up circuit when the car is going in one direction, and the section $g^2$ is connected in the pick-up circuit when the car is going in the opposite direction. The middle section $g$ is connected to the motor through the connection $r$ and the controller $i$ and also connected to the reversing-switch at 3. The end $g^2$ is connected with the points 5 5 of said reversing-switch, and the end $g'$ is connected to the point 6. The resistance $o$ is included between the point 4 of the reversing-switch and the rail return through the car-wheel $l$. When the car is moved to the right, as shown by the arrow, switch $p$ is thrown into the position shown in full lines. When the car is moving in the opposite direction, the said switch is thrown into the position shown in dotted lines. In the position shown in Fig. 1 the end $g'$ is connected through the resistance $o$ directly to ground, and the parts $g$ and $g^2$ are connected together through the switch $p$ and with the motor through $r$ and the controller $i$. By means of the divided collector-shoe and the connections above described a potential approximately equal to the full-line potential is secured between the collector-shoe $f$ and the end $g'$, thus insuring the positive and rapid operation of the advance-switch III.

In Fig. 2 the connection between the conductor-section $a$ and the conductor-section $b$ is indicated by 7, and $e$ is the feeder.

In Fig. 3, 8 8 represent the bolts by which the conductor-sections $a$ and $b$ are secured to their base 9 in the roadway.

In Fig. 4 the contact $a$ is secured by screws 10 to the bell or hollow cover 11, which is insulated, as shown, from the support 12, inclosing the magnet-coil $c$. The lower portion of the support 12 is screw-threaded for the reception of a tube 13 of insulating material. The actuating-coil $c$ is electrically connected to the contact-stud $a$ and connection 7 by the binding-posts 14 and 15 and the mercury-cup 16. The magnet-core 17 reciprocates vertically within the tube 13. This core is electrically connected with a feeder and carries on its upper end a contact 18, of carbon or equivalent material, which when the core is raised engages the carbon contact 19, which is secured to the lower portion of the conductor-section $a$. The support 12 is provided with an upper flange 20, which rests upon the insulation between it and the structure 11, so that when the bolts 8 are removed the entire structure can be removed for repairs. A screw 25, having its upper end extending into the lower portion of the core 17 and its lower portion extending into a mercury-cup and making contact with a screw 26, serves as a means for regulating the normal distance between the contact 18 and contact 19.

A cylinder 21 is arranged vertically beneath the above-described structure and is provided with an interior flange 22, on which rests a suitable support 23 for the terminal structure 24 of the feeder $e$. This terminal structure comprises a mercury-cup, into which the screw 26 extends. An insulating-support 27 serves to prevent the bending of the upwardly-extending portion of the feeder-cable $e$.

What I claim as new, and desire to secure by Letters Patent of the United States, is—

1. In a sectional electric railway, the combination with the feeder, of sectional conductors, electromagnetic switches for connecting the conductor-sections and feeder, and a circuit controlled at each switch, which has two branches, one leading through the car-motor to return, and the other leading through the coil of an advance-switch and a resistance to return.

2. In a sectional electric railway, in combination, a current-collector having its ends insulated from its middle portion, a reversing-switch, connections from said reversing-switch to each section of said current-collector and the motor-circuit, and an independent connection with the return-circuit, whereby either end of said collector may be connected to the return-circuit, while the middle portion and the other end are connected to the motor-circuit.

3. In a sectional railway, the combination with the feeder, of sectional conductors, electromagnetic switches for connecting the conductor-sections and feeder, collector-shoes carried by the car, one of said collector-shoes being divided into parts insulated from each other, and a circuit controlled at each of said electromagnetic switches, which has two branches, one leading through one part of said divided collector-shoe through the car-motor to return, and the other leading through the other shoe, the coil of an advance-switch, another part of said divided shoe to the return.

4. In a sectional railway, the combination with the feeder, of sectional conductors, switches for connecting the conductor-sections and feeder, collector-shoes carried by the car and adapted to engage said conductor-sections, one of said collector-shoes being divided into parts insulated from each other, an auxiliary source of current connected across said shoes, and a circuit controlled at each of said switches, which has two branches, one leading through one part of said divided collector-shoe through the car-motor to return, and the other leading through the other shoe, the coil of an advance-switch, another part of said divided shoe to the return.

In witness whereof I have hereunto set my hand this 6th day of March, 1900.

MARTIN T. A. KUBIERSCHKY.

Witnesses:
 WOLDEMAR HAUPT,
 HENRY HASPER.